US006729203B2

United States Patent
Wesling et al.

(10) Patent No.: US 6,729,203 B2
(45) Date of Patent: May 4, 2004

(54) BICYCLE GEAR SHIFTER HAVING SEPARATE SHIFT CONTROL MEMBERS FOR CABLE PULL AND RELEASE

(75) Inventors: Kevin F. Wesling, Lombard, IL (US); Christopher A. Shipman, Chicago, IL (US); John D. Cheever, Chicago, IL (US); James P. Orrico, Chicago, IL (US); Danny R. Smith, Jr., South Elgin, IL (US); Georg K. Blaschke, Geldersheim (DE)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 10/064,031

(22) Filed: Jun. 4, 2002

(65) Prior Publication Data
US 2003/0221506 A1 Dec. 4, 2003

(51) Int. Cl.[7] .............. F16C 1/10; G05G 1/00; B62K 25/02; B60K 20/00
(52) U.S. Cl. ........... 74/502.2; 74/489; 74/473.14; 74/473.28; 74/506; 74/527; 74/575
(58) Field of Search ............... 74/502.2, 489, 74/473.14, 473.28, 506, 527, 575; 280/260

(56) References Cited

U.S. PATENT DOCUMENTS

| 5,481,934 A | | 1/1996 | Tagawa .................. 74/475 |
|---|---|---|---|
| 5,524,501 A | * | 6/1996 | Patterson et al. ......... 74/473.25 |
| 5,676,020 A | * | 10/1997 | Jordan et al. ............. 74/473.14 |
| 5,802,923 A | | 9/1998 | Hara ....................... 74/473.13 |
| 5,802,927 A | * | 9/1998 | Yu et al. .................... 74/502.2 |
| 5,921,139 A | | 7/1999 | Yamane .................. 74/473.13 |
| 6,021,688 A | * | 2/2000 | Chang ..................... 74/502.2 |
| 6,042,133 A | * | 3/2000 | Leiter et al. ................ 280/260 |
| 6,209,413 B1 | | 4/2001 | Chang ..................... 74/502.2 |

FOREIGN PATENT DOCUMENTS

| DE | 9212927.7 U1 | 1/1993 |
|---|---|---|
| EP | 671317 B1 | 5/1998 |
| WO | WO 99/64290 | * 12/1999 ................. 74/489 |

* cited by examiner

Primary Examiner—Vinh T. Luong
(74) Attorney, Agent, or Firm—Milan Milosevic; Lisa Wunderlich

(57) ABSTRACT

A shifting device including first and second shift control members, a takeup element, a holding member, and a release member. The takeup element configured for winding and unwinding a tensioned control cable. The first control member is rotatable about a handlebar and configured to rotate the takeup to at least pull or wind the control cable onto the takeup. The second control member is a return-to-neutral member for rotating the takeup to release the. The holding member is rotatable with the takeup and retains the takeup in select angular positions. The release member is operable for disengaging the holding member in response to the actuation or return stroke of the second control member for allowing the takeup to unwind the cable a sufficient amount to enable a single gear shift.

48 Claims, 16 Drawing Sheets

BICYCLE GEAR SHIFTER HAVING SEPARATE SHIFT CONTROL MEMBERS FOR CABLE PULL AND RELEASE

BACKGROUND OF INVENTION

This invention relates to bicycle gear shifters and more particularly to a bicycle gear shifter having a shift control member for pulling a control cable and a separate shift control member for releasing the control cable.

It is known in the art to provide a gear shifter that has separate mechanisms for pulling and releasing a control cable connected to a gear-change mechanism. Such a shifter is shown in German Utility Model Publication DE G9212927 (Jedek). This shifter includes both a first shift control member rotatable about the handlebar to pull cable and a second shift control member, a finger-operated lever, operable to release or unwind the cable. The release lever disclosed is a two-stroke or return-to-neutral device having both an actuation stroke and a reversibly-sprung return stroke. Since the release lever is linked to a takeup element through a ratchet, the takeup element is released and unwinds under the lever actuation stroke, when the rider depresses the lever, and is prevented from further unwinding under the lever return stroke, when the rider releases the lever to reengage the takeup. Since the takeup element in this device may fully unwind under the lever actuation stroke alone, the rider must carefully time his release of the lever (i.e. the lever return stroke) in order to shift to the desired gear and prevent full unwinding of the takeup. In other words, two strokes, both the actuation and return strokes of the release lever are required in order to achieve a gear change corresponding to less than a full unwinding of the takeup element.

Another bicycle shifter is disclosed in U.S. Pat. No. 5,802,923 (Hara). The Hara shifter also includes a first shift member rotatable about the handlebar for pulling a cable and a separate return-to-neutral lever for releasing the cable. The release lever disclosed in this patent is linked to a takeup element by a pair of toggling pawls forming an escapement mechanism. The toggling pawls sequentially engage the takeup element in response to operation of the release lever. Although the presence of a second pawl in the Hara shifter prevents the uncontrolled unwinding of the takeup element described above in the Jedek shifter, it introduces an undesirable two-step cable release operating sequence. Under the actuation stroke of the release lever, when the rider depresses the lever, the second pawl is toggled to engage the takeup element permitting partial unwinding of the takeup. Subsequently, under the return stroke of the lever, when the rider releases the lever, the second pawl is disengaged to permit sufficient unwinding of the takeup element to complete the desired shift. In other words, the desired full release shift occurs only through the staggered, two-stroke or two-step operation of the release lever, triggering two discrete start-stop motions of the derailleur to which the control cable is attached. The Hara shifter, therefore, embodies intermittent operation of the release lever leading to interrupted motion of the gear-change mechanism to which it is attached. Such a staggered cable release sequence is counterintuitive to the rider resulting in cumbersome and choppy shifting. Furthermore, the toggling pawls of the Hara device require greater precision to manufacture, including tighter manufacturing and assembly tolerances, resulting in higher manufacturing costs.

Another bicycle shifter having two shift control members is disclosed in U.S. Pat. No. 6,209,413 (Chang). This shifter includes both a grip rotatable about the handlebar for pulling a cable and a separate release ring also rotatable about the handlebar for releasing the control cable. The release ring of the Chang device, however, is operable to achieve multiple gear shifts for each actuation stroke or operating twist of the release ring, leading to possible inadvertent multiple release shifts when riding on rough terrain. Additionally, the release ring of this device does not return to a home or neutral position upon completion of each release shift operation. Although this type of device does permit the rider to select one or more release gear shifts per operation of the release ring, it does not permit the quick and predictable, single-gear, return-to-neutral release shifts of the present invention.

For the foregoing reasons, there is a need for a bicycle shifter having separate cable pull and cable release control mechanisms, including a release control member permitting predetermined, single gear, return-to-neutral release shifts, where the entire cable release for the single gear shift occurs under a single stroke—actuation or return—of the release control member.

SUMMARY OF INVENTION

The present invention is directed to a shifting device that satisfies this need. One object is to provide a bicycle shifter that pulls cable by rotating a first shift control member about the handlebar and releases cable by actuating a separate second shift control member in such a way that the rider can predictably release a single gear using a single actuation or a single release stroke of the release lever even on very rough terrain.

Another object of the invention is to provide a shifting device having a cable release control member that is conveniently and ergonomically located for easy operation by the rider be it a lever, pushbutton, or rotatable ring design. The invention likewise includes an ergonomic first control member that may include a handgrip or a finger-actuated member.

A further object of the invention is to provide a shifting device having a cable release operation that precisely releases a single gear with a single actuation or single return stroke using fewer parts, permitting larger manufacturing and assembly tolerances, and permitting compact packaging of the shifter and production at reduced costs.

Accordingly, the shifting device includes first and second shift control members, a takeup element, a holding member, and a release member. The takeup element is configured for winding and unwinding a control cable. The first control member is rotatable about a handlebar and configured to rotate the takeup to at least pull or wind the control cable onto the takeup. The second control member is a return-to-neutral member for rotating the takeup to release or unwind the cable an amount corresponding to a single gear. The holding member is rotatable with the takeup and configured to retain the takeup in select or particular angular positions. The release member is operable for releasing the holding member in response to the actuation stroke or the return stroke of the second control member for allowing the takeup to unwind the cable a sufficient amount to complete one gear shift.

In the shifting device of the present invention a release transmission may be used to communicate the motion of the second control member to the release member. The release transmission may be configured to respond to the actuation stroke or the return stroke of the second control member.

In the shifting device of this invention, the takeup element may be rotatable with or separately from the first control member. In the embodiments where the takeup is separately rotatable from the first control member, a ratcheting driving member may be used to permit unwinding of the takeup separately from the first control member. In the case of a handgrip first control member, for example, the rider may effect a cable release shift without releasing his grip from the handgrip.

In further embodiments, a return-to-neutral spring may be used to operably connect the first control member to the handlebar. In the case of a first control member comprising a thumb lever, for example, the return-to-neutral operation would predictably return the thumb lever to the same home position after each shift operation.

In further embodiments, a spring operably connecting the release member and the takeup element permits the release member to load the spring just prior to releasing the takeup thereby boosting the unwinding operation of the takeup for more positive shifts. Such a spring is described as spring element 10 in U.S. Pat. No. 6,367,347 B1 (Blaschke), assigned to the applicant of this invention, and is fully incorporated herein by reference. In Blaschke, spring element 10 is shown as a coil spring loaded in compression during cable release, but may take on other forms.

In further embodiments, the first control member may be configured to both wind and unwind the takeup element, providing secondary or parallel means for releasing the cable in addition to actuation of the second control member.

In yet further embodiments, the first control member may be configured to rotate solely in the cable pull direction using a ratchet coupling the first control member to the handlebar.

These and other features and advantages of the invention will be more fully understood from the following description of certain specific embodiments of the invention taken together with the accompanying drawings.

BRIEF DESCRIPTION OF DRAWINGS

In the drawings:

FIG. 1 is an exploded perspective view of the shifting device according to a fourth embodiment of the present invention;

DETAILED DESCRIPTION

Figure 1:
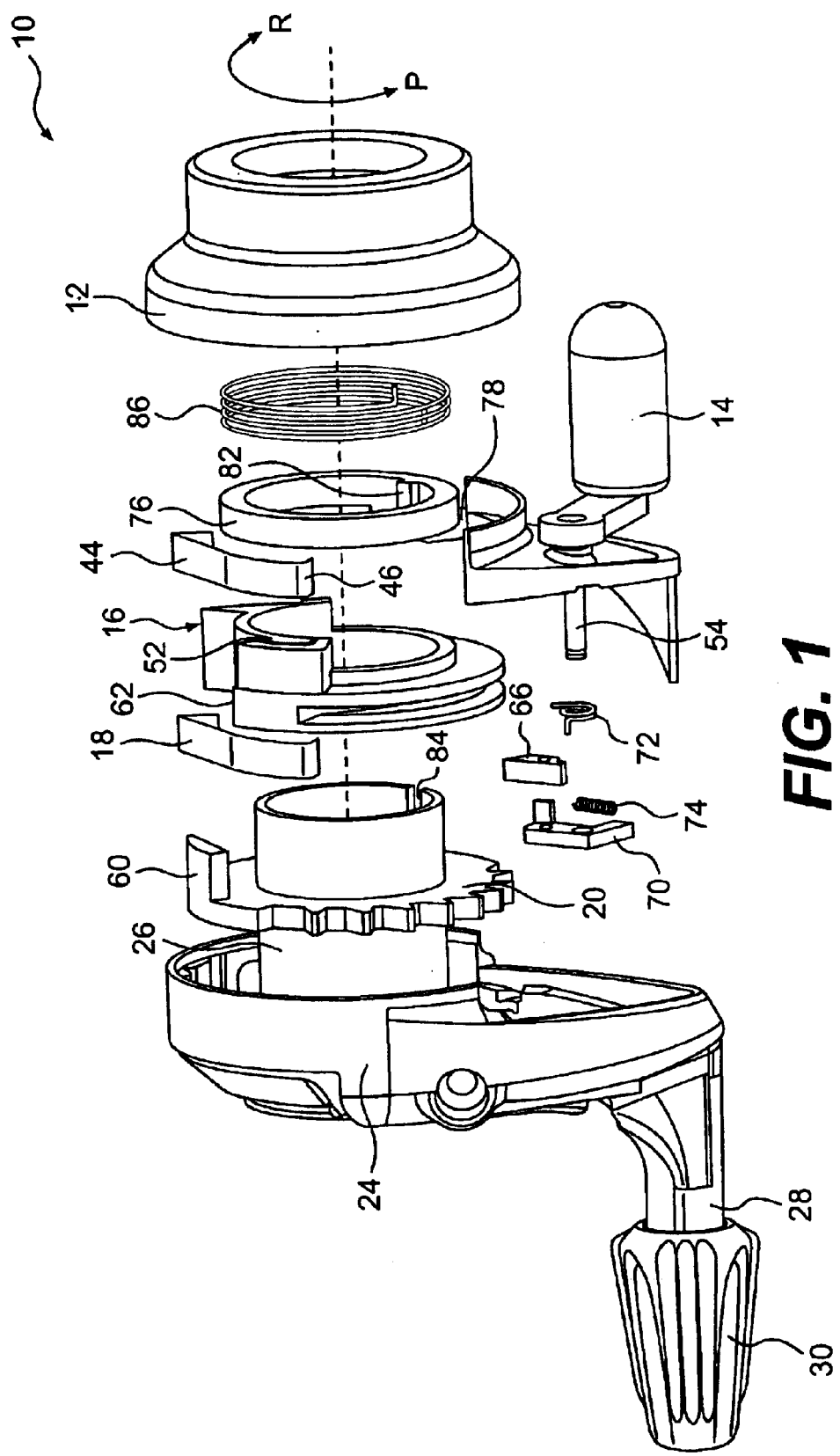
FIG. 1 is an exploded perspective view of a shifting device according to one embodiment of the present invention.

FIGS. 1–6 depict a shifting device according to one embodiment of the present invention. The shifting device 10 generally includes a first control member 12, a second control member 14, a takeup element 16, a holding member 18 and a release member 20. To shift between the gears of the bicycle, the first and second control members 12, 14 are actuated to pull or release a control cable 22 connected to a gear mechanism (not shown) such as a derailleur or an internal gear hub. The shifting device 10 includes a housing 24 fixedly mounted on a handlebar (not shown). The housing 24 includes a mandrel 26 positioned over the handlebar and a noodle portion 28 extending generally parallel to the handlebar for redirecting the cable. A barrel adjuster 30 for adjusting the length of cable travel is attached to the noodle 28 of the housing 24, the noodle 28 and barrel adjuster 30 receiving the control cable 22 therethrough.

The takeup element 16 may be rotatably mounted on the mandrel 26 to be rotatable in a cable release direction R and a cable pull direction P. In alternative embodiments, the takeup element 16 may be rotatable about an axis offset from the mandrel 26. One end of the control cable 22 is attached to the takeup 16 at a cable anchor 32 and the other end of the control cable 22 is attached to the gear-change mechanism. The takeup 16 includes a cable groove 34 extending along an outer circumference of the takeup 16 for winding and unwinding the control cable 22 thereupon. The takeup 16 is biased in the cable release or unwinding direction by tension in the control cable 22 caused by a return spring in the gear-change mechanism.

Figure 3:
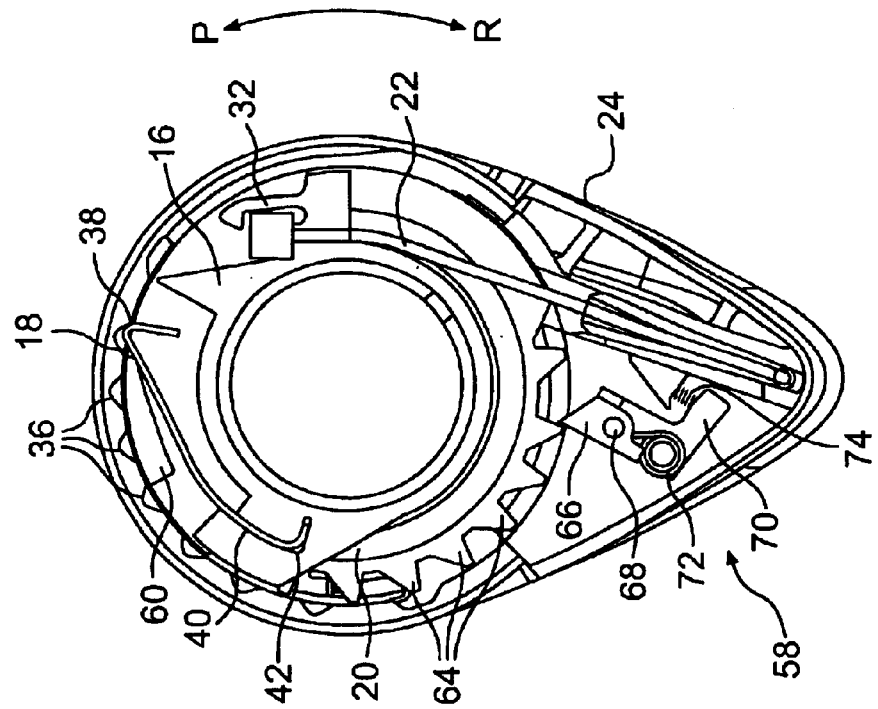
FIG. 3 is a sectional view through the takeup element, looking inboard, of the shifting device of FIG. 1 showing the holding member partially released from the notches of the housing.
Figure 2:
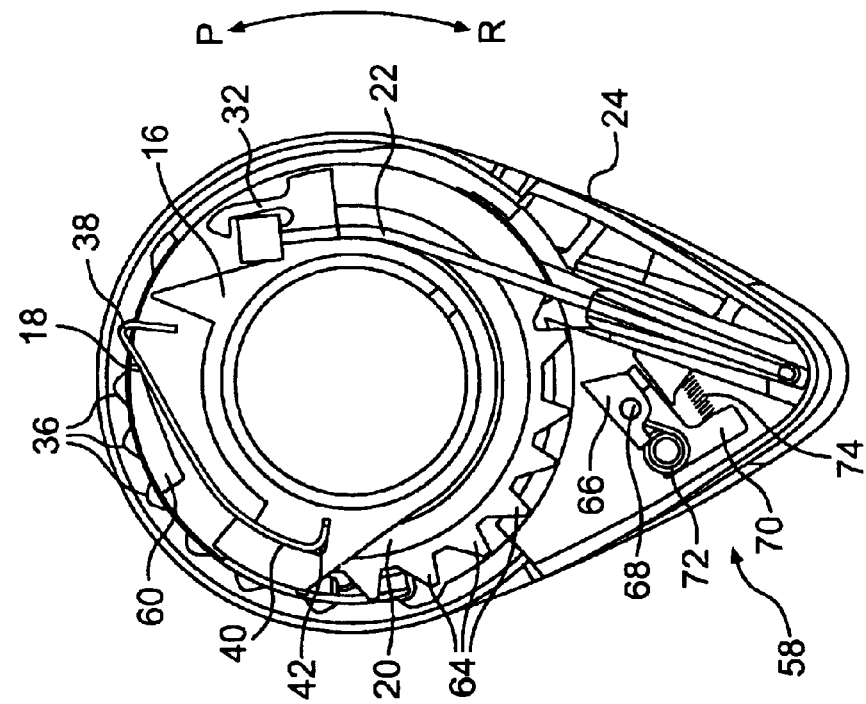
FIG. 2 is a sectional view through a takeup element, looking inboard, of the shifting device of FIG. 1 showing a holding member engaged with notches of a housing.
Figure 5:
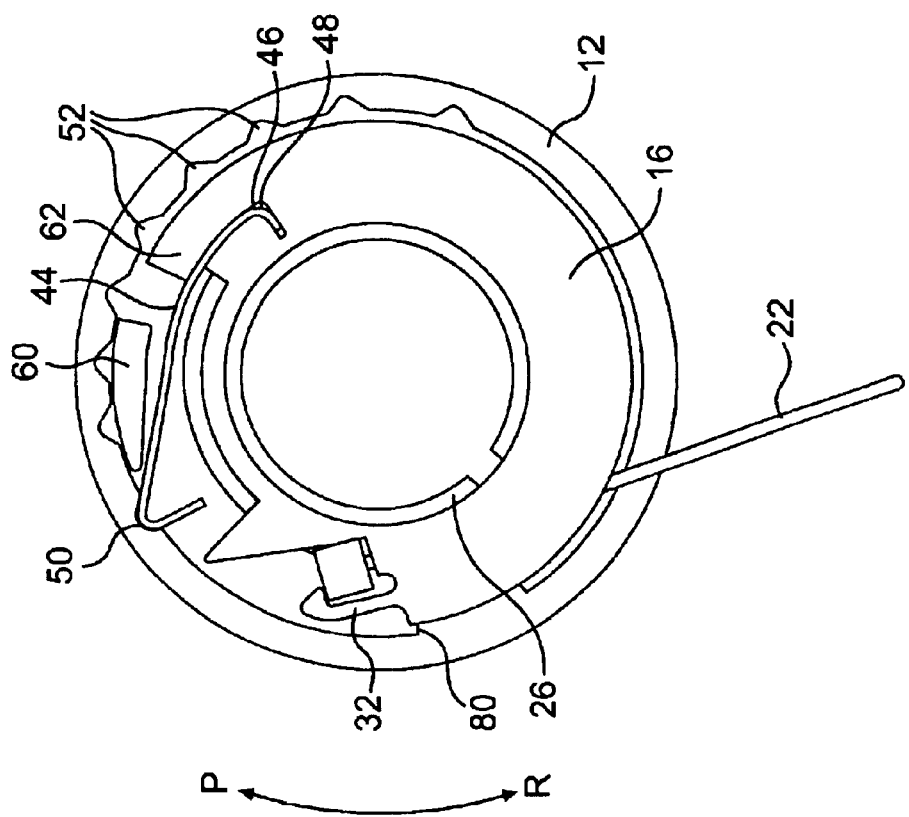
FIG. 5 is a sectional view through the takeup element, looking outboard, of the shifting device of FIG. 1 showing a driving member engaged with notches of a first control member.
Figure 4:
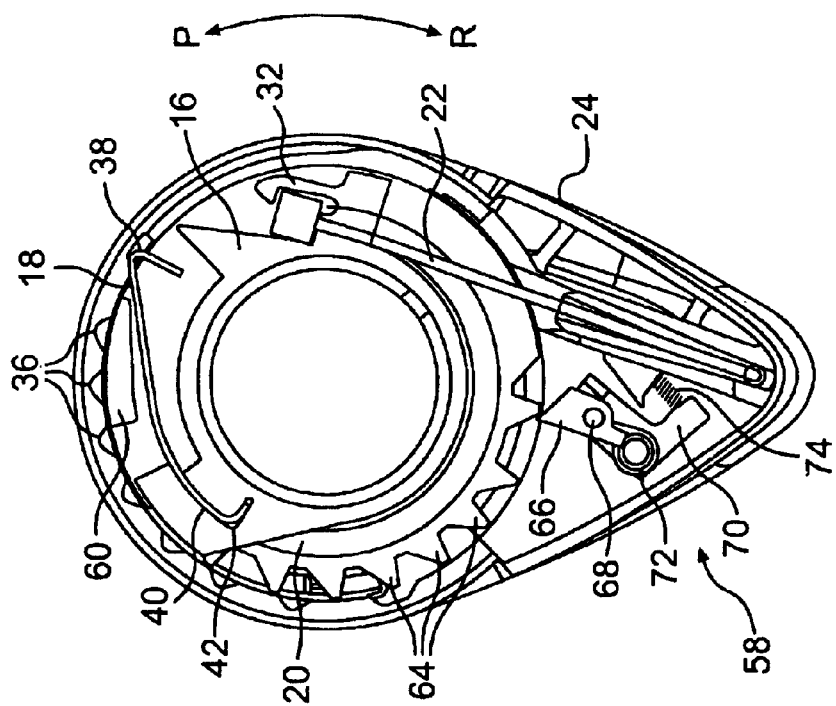
FIG. 4 is a sectional view through the takeup element, looking inboard, of the shifting device of FIG. 1 showing the holding member engaged in another notch of the housing.
Figure 6:
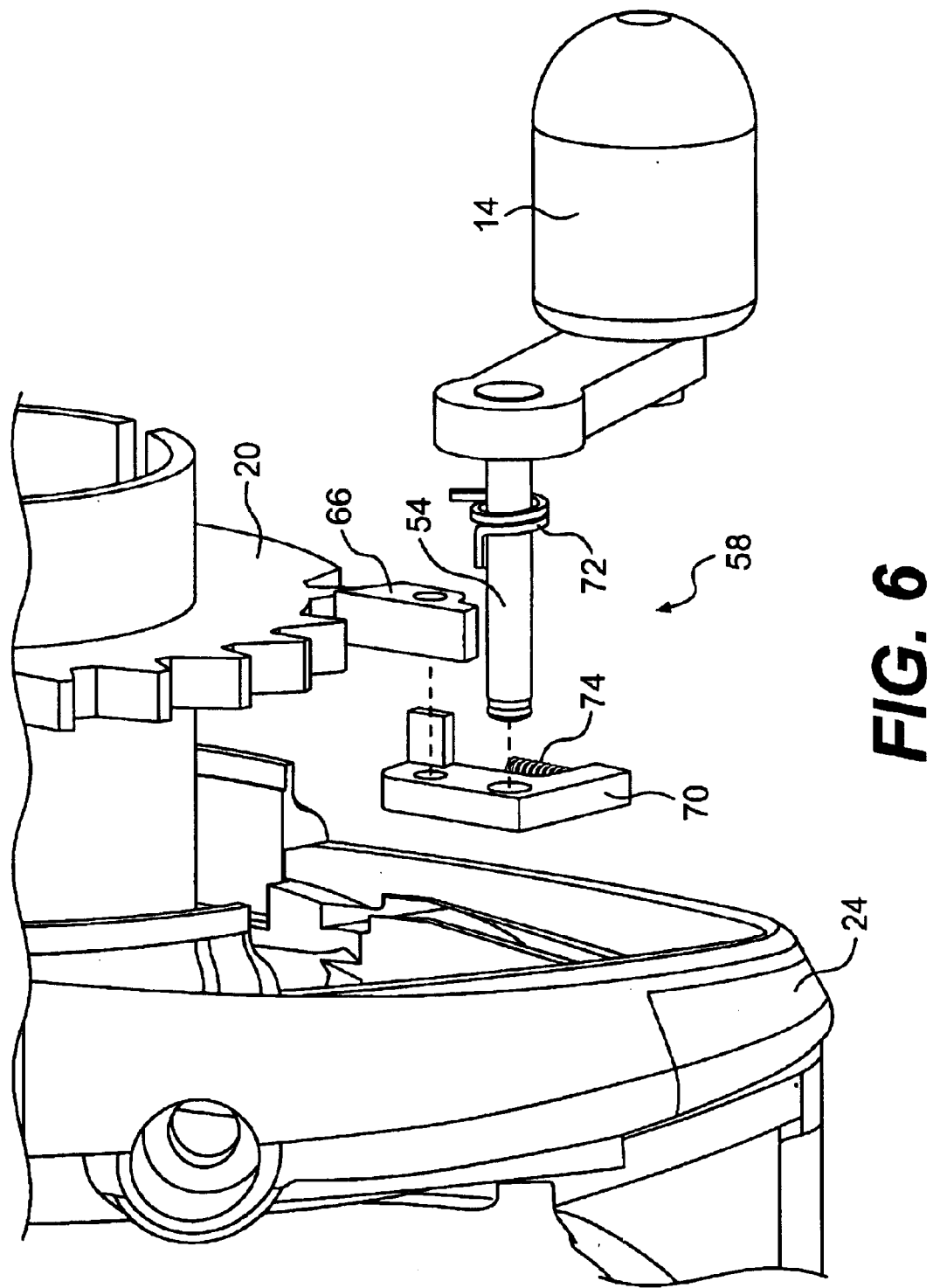
FIG. 6 is a partial exploded perspective view of the shifting device of FIG. 1 showing a release lever and a release transmission.

Referring to FIGS. 2–4, the housing 24 further includes an first array of holding notches 36 located on an inner surface of the housing 24, the spacing between the notches 36 corresponding to discrete shift positions of the gear-change mechanism. The holding member 18 may take the form of a biased leaf spring. A detent 38 of the holding member 18 selectively engages one of the notches 36 of the housing 24. A base portion 40 of the holding member 18 is received in a first retaining portion 42 of the takeup 16. The holding member 18 may be radially biased to retain the takeup 16 in a select angular position relative to the handlebar or the housing 24. The holding member 18 forms a holding ratchet mechanism wherein the holding member 18 and the housing notches 36 are configured to prevent rotation of the takeup 16 in the cable release direction R relative to the housing when the detent 38 is seated within a notch 36, but permit rotation of the takeup 16 in the cable pull direction P relative to the housing 24 when the detent 38 is seated within a notch 36.

The first control member 12 may be a rotatable handgrip as shown in FIG. 1. A driving member 44 operably connects the rotatable handgrip 12 to the takeup 16 and may take the form of a biased leaf spring. A base portion 46 of the driving member 44 is received within a second retaining portion 48 of the takeup 16. A detent 50 of the driving member 44 selectively engages an array of driving notches 52 located on an inner surface of the handgrip 12, the spacing between the array of driving notches 52 corresponding to discrete shift positions of the gear-change mechanism (see FIG. 5). Alternatively, the second retaining portion 48 and the array of driving notches 52 may swap their respective locations in the takeup 16 and the handgrip 12, the detent 50 still engaging the notches 52 and the base 46 still received by the second retaining portion 48. The driving member 44 may be radially biased between the first control member 12 and the takeup 16. The driving member 44 and the array of driving notches are configured to prevent rotation of the first control member 12 in the cable pull direction P relative to the takeup 16 when the driving member detent 50 is seated within a notch 52 of the first control member 12, but permit reverse rotation of the first control member 12 in the direction R relative to the takeup 16 when the driving member detent 50 is seated within a notch 52 of the first control member 12. The driving member 44 and the holding member 18 may comprise leaf springs as shown in FIGS. 1–5 or sprung pawls or similar ratcheting members. Both the driving member 44 and the holding member 18 may be shaped differently, including their respective detents, 50, 38 and base portions 46, 40. Additionally, the driving member 44 and the holding member 18 can be released or disengaged separately and need not be located adjacent to each other as shown.

The second control member 14 may be a release lever as shown in FIGS. 1–12. The release lever 14 is rotatable about a lever shaft 54. The release lever 14 actuates a release transmission 58 to permit rotation of the takeup 16 in the cable release or unwinding direction R. The release transmission 58 operably connects the release lever 14 to the release member 20. Release member 20 may be formed as a release ring rotatable about the mandrel 26 of the housing 24 and may include a release cam 60 protruding from the release member 20 to be engageable with the holding member 18 and the driving member 44. Alternatively, driving member 44 may be released or disengaged by a discrete member operable in response to rotation of release member 20. Release cam 60 is positioned such that the holding and driving members 18 and 44 limit its rotation in the release direction R relative to the takeup 16 and a protrusion 62 on the takeup 16 limits its rotation in the pull direction P relative to the takeup such that when the takeup 16 is rotated to pull cable, the release ring 20 follows along passively. The second control member 14 may be oriented substantially parallel to the bicycle handlebar.

The release ring 20 also includes a plurality of teeth 64 on an outer periphery of the release ring 20 that are engageable with a release pawl 66 of release transmission 58. The release pawl 66 rotates about a pin 68 mounted on a pawl bracket 70 and is biased in a clockwise direction (FIGS. 2–4) by a release pawl return spring 72. The release lever 14, lever shaft 54 and pawl bracket 70 all rotate together and are biased in a clockwise direction (FIGS. 2–4) by a lever return spring 74 supported by the housing 24. FIG. 2 shows the release transmission in a home or rest position. Actuation of the release lever 14 by a finger of the rider's hand in the counterclockwise direction rotates the pawl bracket 70 in the counterclockwise direction until the release pawl 66 contacts one of the teeth 64 of the release ring 20. Continued rotation of the release lever 14 in the counterclockwise direction further rotates the release ring 20 in the release direction R driving the release cam 60 into the detents 38, 50 of the holding and driving members 18, 44, respectively, thereby disengaging the detents 38, 50 from their respective seats in housing notches 36 and handgrip notches 52 (see FIG. 3). Disengagement of detent 38 of holding member 18 from a housing notch 36 permits rotation of the takeup 16 in the cable release direction R, under the cable tension by the gear-change return spring, until the detent 38 of holding member 18 engages the next housing notch 36 (FIG. 4). Likewise, and in this embodiment concurrently, disengagement of the detent 50 of driving member 44 from a handgrip notch 52 permits rotation of the takeup 16 in the cable release direction R, allowing the detent 50 of the driving member 44 to engage the next handgrip notch 52. Under the return stroke of the release lever 14, the rider removes his hand from the release lever 14 permitting clockwise rotation of the release lever 14 and the pawl bracket 70 under the action of lever return spring 74 thereby returning the lever to its home or rest position. During clockwise rotation of the pawl bracket 70, the release pawl 66 ratchets past the teeth 64 of the release ring 20.

In alternative embodiments, the release lever 14, the release transmission 58 and the release member 20 may easily be reconfigured to release a single gear in response to the return stroke of the release lever 14 and not the actuation stroke. In such embodiments, the total cable release required to effect the single release shift would occur solely under the return stroke of the release lever 14.

The rotatable handgrip 12 may be configured to have a home or neutral position that it returns to after every pull shift operation. A grip stop 76 fixed relative to the handlebar has a protrusion 78 that abuts against a protrusion 80 on the inner surface of the handgrip 12 to define the rest position of the handgrip 12. In this embodiment, a key 82 on the grip stop 76 fits into a groove 84 on the mandrel 26 to fix the grip stop 76 relative to the handlebar. A grip return spring 86 is disposed between the rotatable handgrip 12 and the grip stop 76 for returning the handgrip 12 back to its rest position when the handgrip 12 is released by the rider. A cable release boost spring (not shown) may be used to connect the release member 20 to the takeup 16. Upon rotation of the release member 20 in the release direction R, the boost spring would be loaded such that upon release of the holding member 18 by the release cam 60, the takeup 16 would be accelerated in the cable release direction to effect a more positive release shift instead of relying solely on the control cable tension to unwind the takeup 16.

According to the first embodiment of the invention shown in FIGS. 1–6, a gear shift in the cable pull direction P is described. A rider rotates the first control member 12 in the cable pull direction P to transmit this rotation to the takeup 16 through the driving member 44 winding the control cable 22 about the takeup 16 and moving the detent 38 of the holding member 18 from one housing notch 36 into another housing notch 36 corresponding to one or more gear shifts. As the takeup 16 is rotated in the cable pull direction P, the release member 20 follows along passively and the grip return spring 86 is loaded. Once the rider has shifted to the desired gear, the rider may release the handgrip 12. Upon release of the handgrip 12, loaded grip return spring 86 returns the handgrip 12 to its initial rest or neutral position, the handgrip notches 52 passively clicking or traversing over the detent 50 of the driving member 44.

Further, according to the first embodiment of the invention shown in FIGS. 1–6, a gear shift in the cable release direction R is described. A rider uses a finger to displace the second control member 14 through a complete actuation stroke. The actuation stroke of the second control member 14 is transmitted to the release member 20 through a release transmission 58 to rotate the release member 20 in the cable release direction R. The rotation of the release member 20 in the cable release direction R under the actuation stroke of the second control member 14 releases the holding member 18 and driving member 44 through release cam 60 and loads the lever return spring 74. Release of the holding member 18 by the release cam 60 disengages the takeup 16 from the housing 24 and release of the driving member 44 by the release cam 60 disengages the takeup 16 from the first control member 12 to permit rotation of takeup 16 in the cable unwinding direction R under the tension of control cable 22 (and the cable boost spring, if included). Since the release member 20 is rotated in the cable release direction R an amount corresponding to one gear, the holding member 18 and driving member 44 will re-engage the housing 24 and first control member 12, respectively, as the takeup 16 unwinds. Upon release of the second control member 14 by the rider's finger, the lever return spring 74 returns the second control member 14 to its initial rest position with no further gear shifts occurring in the cable release direction R under the return stroke of the second control member 14.

Figure 7:
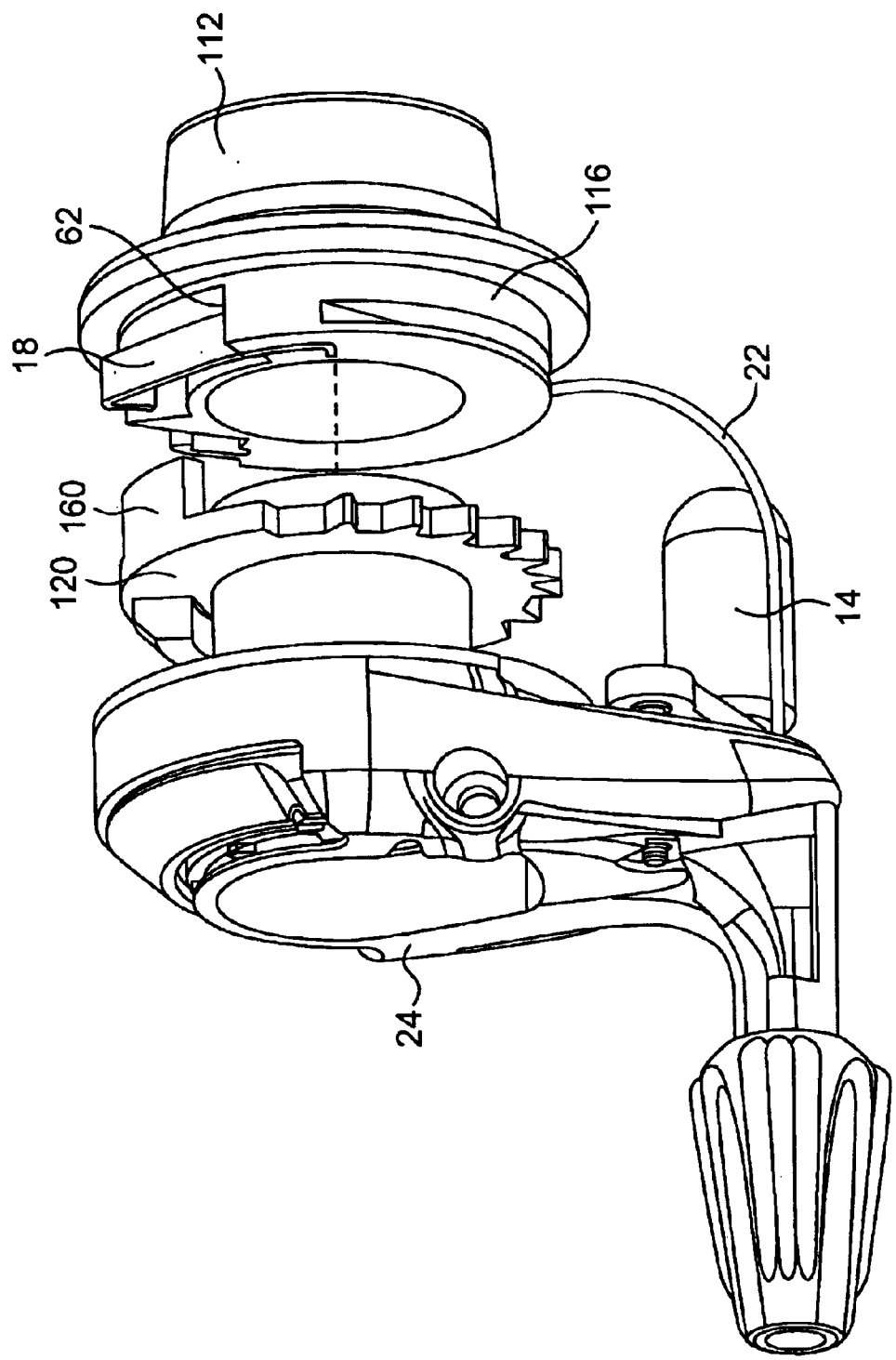
FIG. 7 is an exploded perspective view of a shifting device according to a second embodiment of the present invention.

FIG. 7 is a simplified embodiment of the invention where the driving member 44 and the corresponding array of detents 52 in the first control member 12 of the first embodiment are omitted. Accordingly, a first control member 112 and a takeup 116 rotate together and the first control member 112 does not return to a home or rest position upon initial rotation and release of the first control member 112 by the rider. In this embodiment, when the rider stops rotating the first control member 112 in the cable pull direction P and releases the first control member 112, the first control member 112 remains in the same position as the takeup 116. Likewise, when the release lever 14 is actuated, resulting in the release of the takeup 116 in the cable release direction R, the first control member 112 unwinds with the takeup 116 since the now truncated release cam 160 (no longer required to release a driving member 44) does not disengage the takeup 116 from the first control member 112. The holding member 18 continues to operatively engage an array of detents 36 in the housing 24 and the first control member 112 may be a handgrip as shown in FIG. 7. Furthermore since the driving member 44 is omitted, the handgrip 112 and the takeup 116 may be integrally formed. Due to the omission of the driving member 44, as well as related parts such as the grip stop 76 and the return spring 86 of the first embodiment, the embodiment of FIG. 7 may be produced at lower cost and at reduced weight.

Figure 8:
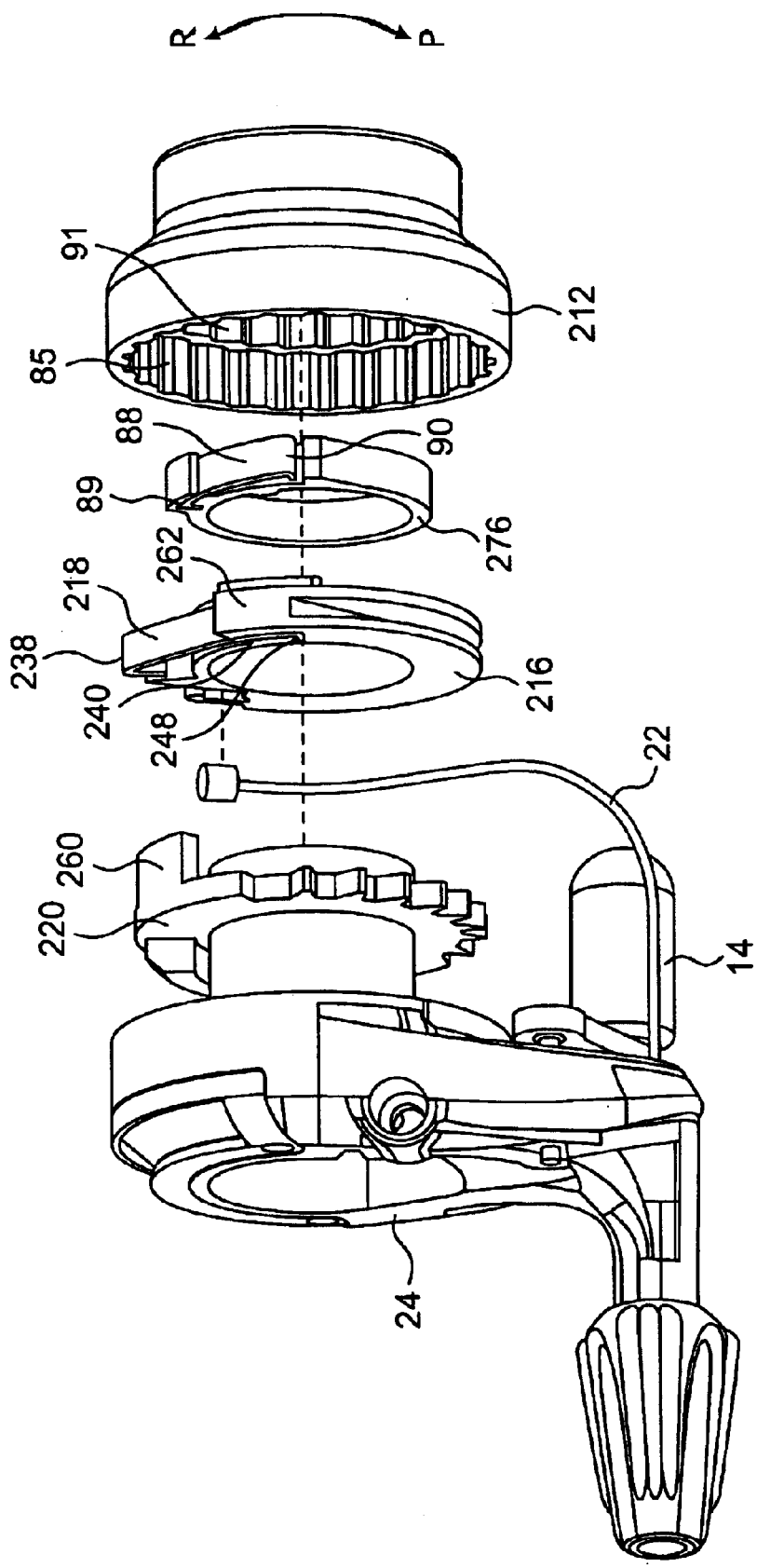
FIG. 8 is an exploded perspective view of a shifting device according to a third embodiment of the present invention.
Figure 9:
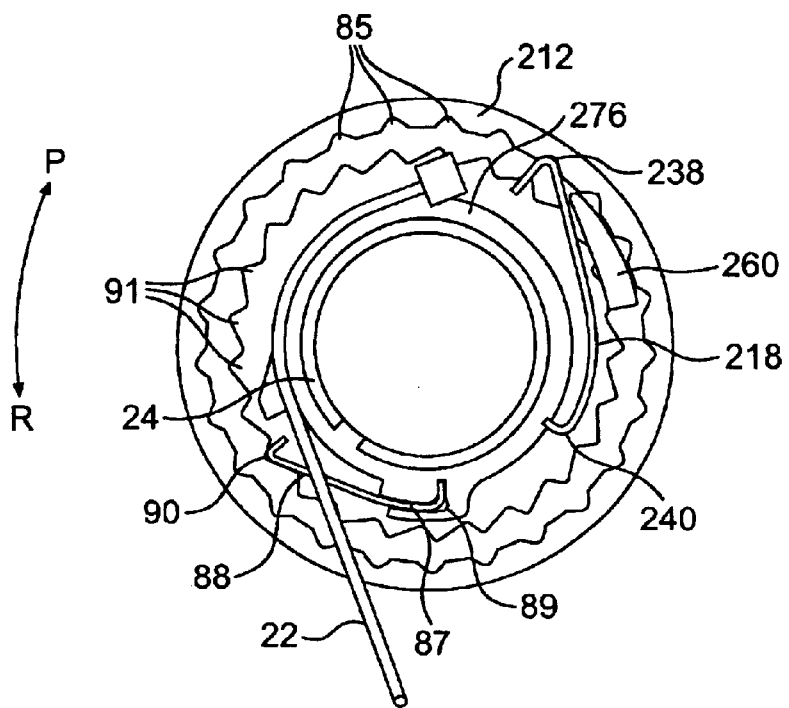
FIG. 9 is a sectional view of the shifting device of FIG. 8.
Figure 10:
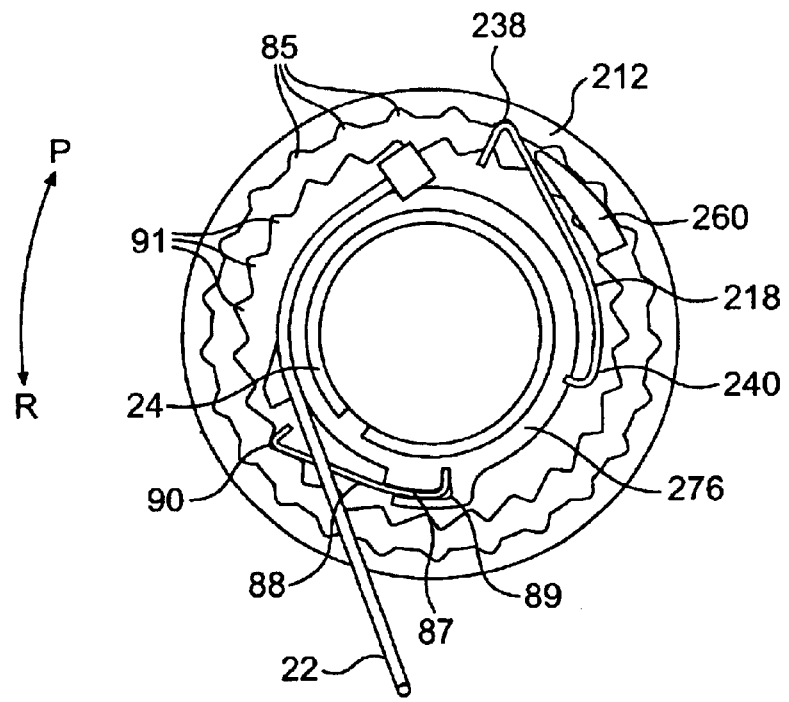
FIG. 10 is a sectional view of the shifting device of FIG. 9 after the device has been released one gear.

FIGS. 8–10 show another embodiment of the invention where a first control member 212 rotates only in the cable pull direction P and a holding member 218 combines the functions of the holding member 18 and driving member 44 of the first embodiment of FIGS. 1–6. In this embodiment, a grip stop 276 receives a base portion 87 of a resilient member 88 in a first retaining portion 89 of the grip stop 276 and a detent portion 90 of the resilient member 88 selectively engages a first array of notches 91 located on an inner surface of the first control member 212. The resilient member 88 forms a first control member ratchet mechanism wherein the resilient member 88 and a first array of notches 91 are configured to only permit rotation of the first control member 212 in the cable pull direction P. The holding member 218 includes a base portion 240 received by a second retaining portion 248 of a takeup 216 and a detent portion 238 selectively engageable in a second array of notches 85 formed on an inner surface of the first control member 212. The holding member 218 and the second array of notches 85 are configured to prevent rotation between the takeup 216 and the first control member 212. To pull cable, the first control member 212 is rotated by the rider in the cable winding direction P, the rotation of the first control member 212 being transmitted to the takeup 216 through the holding member 218 (now functioning as the driving member 44 of the first embodiment of FIGS. 1–6). As the first control member 212 is rotated in the cable pull direction P, the detent 90 of the resilient member 88 passively clicks or traverses along the notches 91 of the first control member 212. Upon release of the first control member 212 by the rider, the first control member 212 is prevented from reverse rotation in the cable release direction R by the resilient member 88. To release cable, the release lever 14 is actuated and a release cam 260 of the release member 220 disengages the holding member 218 (now acting as the holding member 18 of the first embodiment of FIGS. 1–6) to release the cable 22 from the takeup 216. The first control member 212 continues to remain statutory during cable release even though the holding member 218 is disengaged from the first control member 212 as the resilient member 88 prevents rotation of the first control member 212 from in the release direction R. Because the tension of the cable 22 is routed through the first control member 212, any slop or play between the first control member 212 and the takeup 216 is eliminated.

Figure 11:
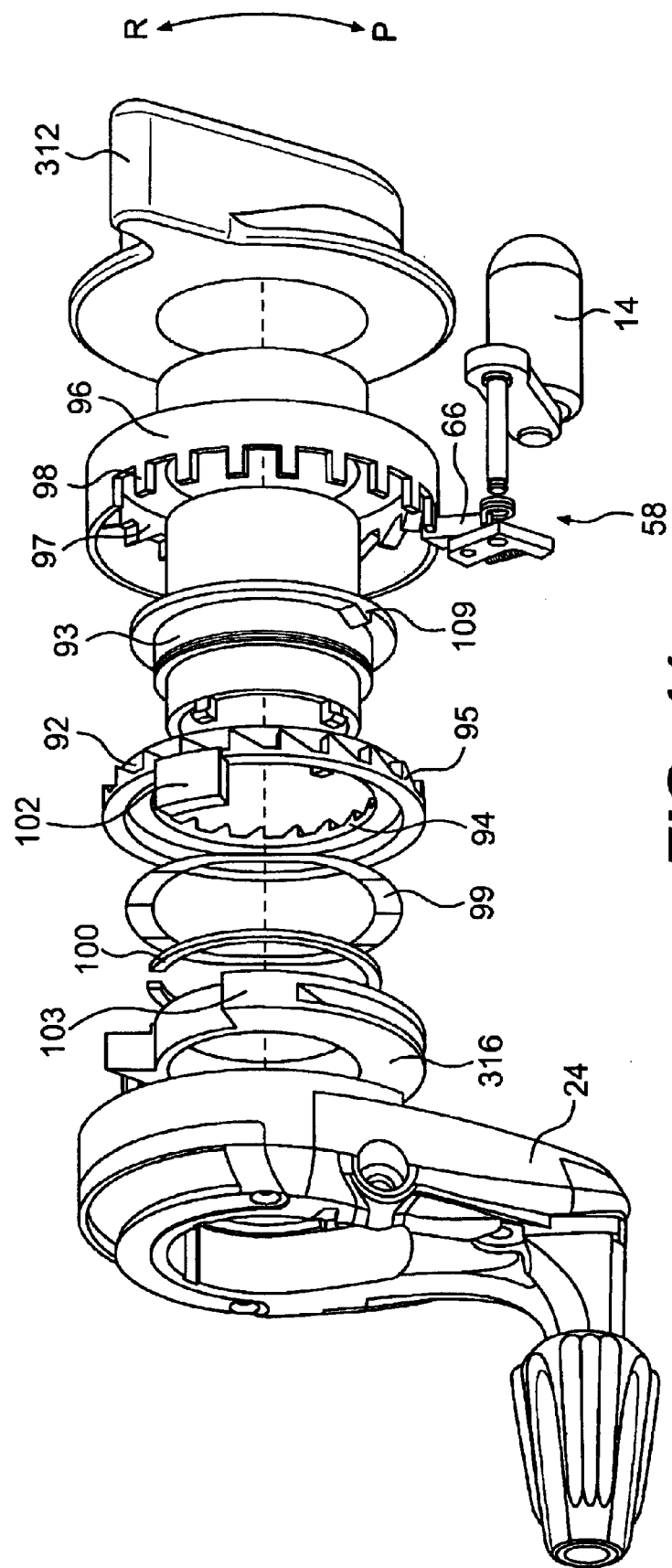
Figure 12:
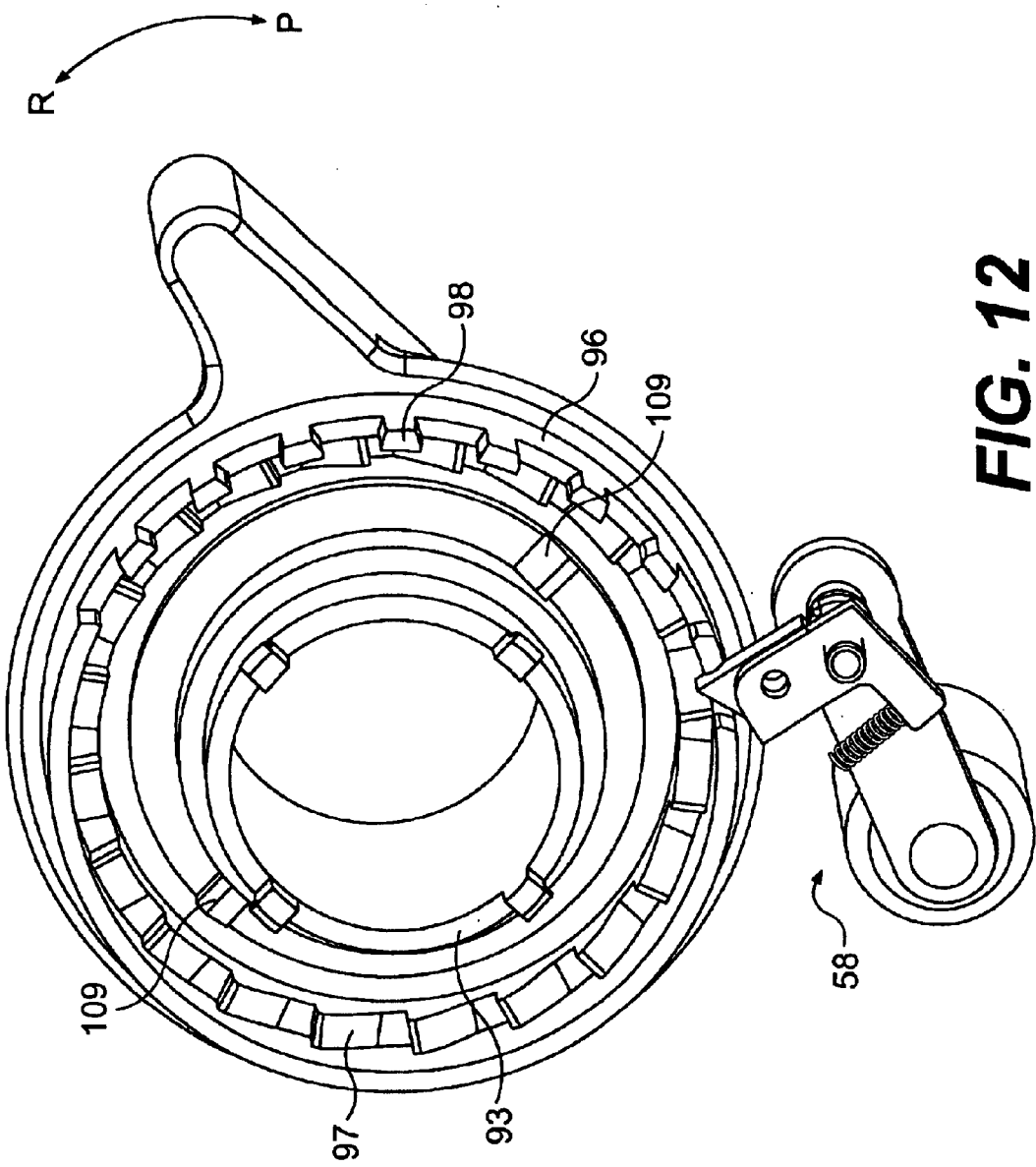
FIG. 12 is a perspective view of a release ring and a release transmission of the shifting device of FIG. 11.

The embodiment of FIGS. 11 and 12 differs from the embodiments of FIGS. 1-10 in the configuration and construction of the holding member which is a sprung clutching ring 92. The shifting device includes a tube 93 fixedly attached to the housing 24. A takeup 316 rotates on the tube 93 and its angular position relative to the housing 24 determines the selected gear of the gear-change mechanism. The holding member 92 rotates about the tube 93, is axially displaceable along the tube 93, and has an inner array of notches 94 on an inner surface thereof and an outer array of notches 95 on an outer surface thereof. A release ring 96 also has an inner array of notches 97 and an outer array of notches 98. The holding member is axially biased along the tube 93 by a wave spring 99 and retaining ring 100 to cause the holding member inner notches 94 to selectively engage a tooth or set of teeth 109 on the tube 93, the holding member inner notches 94 and the teeth 109 configured to prevent rotation of the holding member in cable release direction R relative to the tube 93 but permit rotation of the holding member in the cable pull direction P relative to the tube 93. The holding member outer notches 95 selectively engage the inner notches 97 of the release ring 96. The outer notches 98 of release ring 96 engage the release pawl 66 of the release transmission 58. The release ring 96 and the rotatable grip 312 are rotationally coupled to each other and rotatable about the tube 93. The release member 96 and the holding member are also rotationally coupled to each other in the cable pull direction and rotatable about the tube 93. A protrusion 102 of the holding member 92 transmits rotation of the holding member 92 in the cable pull direction P to a protrusion 103 of the takeup 16. A first control member 312 may be in the form of a finger-actuated lever. In alternative embodiments, the first control member 312 and release ring 96 may be formed integrally.

In a rest position, when the rider's hand is removed from the first control member 312, the takeup 16 is biased in the cable release direction R by the tension in cable 22. So biased, the takeup protrusion 103 rotationally biases the holding member 92 through protrusion 102 of the holding member 92 in the cable release direction R, the wave spring 99 axially biasing the holding member inner notches 94 against the teeth 101 of the tube 93. Rotation of the first control member 312 in the cable pull direction P is transmitted directly to the release member 96. Rotation of the release member 96 in the cable pull direction P is transmitted to the holding member 92 through teeth 109 of the release member 96. Rotation of the holding member 92 in the cable pull direction P is in turn transmitted to the takeup protrusion 103 by the holding member protrusion 102.

To release cable, the release lever 14 is actuated to transmit rotation to the release member 96 in the cable release direction R. As the release member 96 is rotated in the cable release direction R, the release member inner notches 97 operably engage the holding member outer notches 95, axially displacing the holding member 92 to disengage the holding member inner teeth 94 from the teeth 101 of the tube 93 against the wave spring 99, allowing the holding member 92 and takeup 316 to unwind in the cable release direction R for a single gear shift. The single gear shift in the release direction R occurs under the actuation stroke of the release lever 14. As in the other embodiments of the invention, the release lever 14, the release transmission 58, and the release member 20 may be reconfigured to release a single gear solely under the return stroke of the release lever 14.

Figure 13:
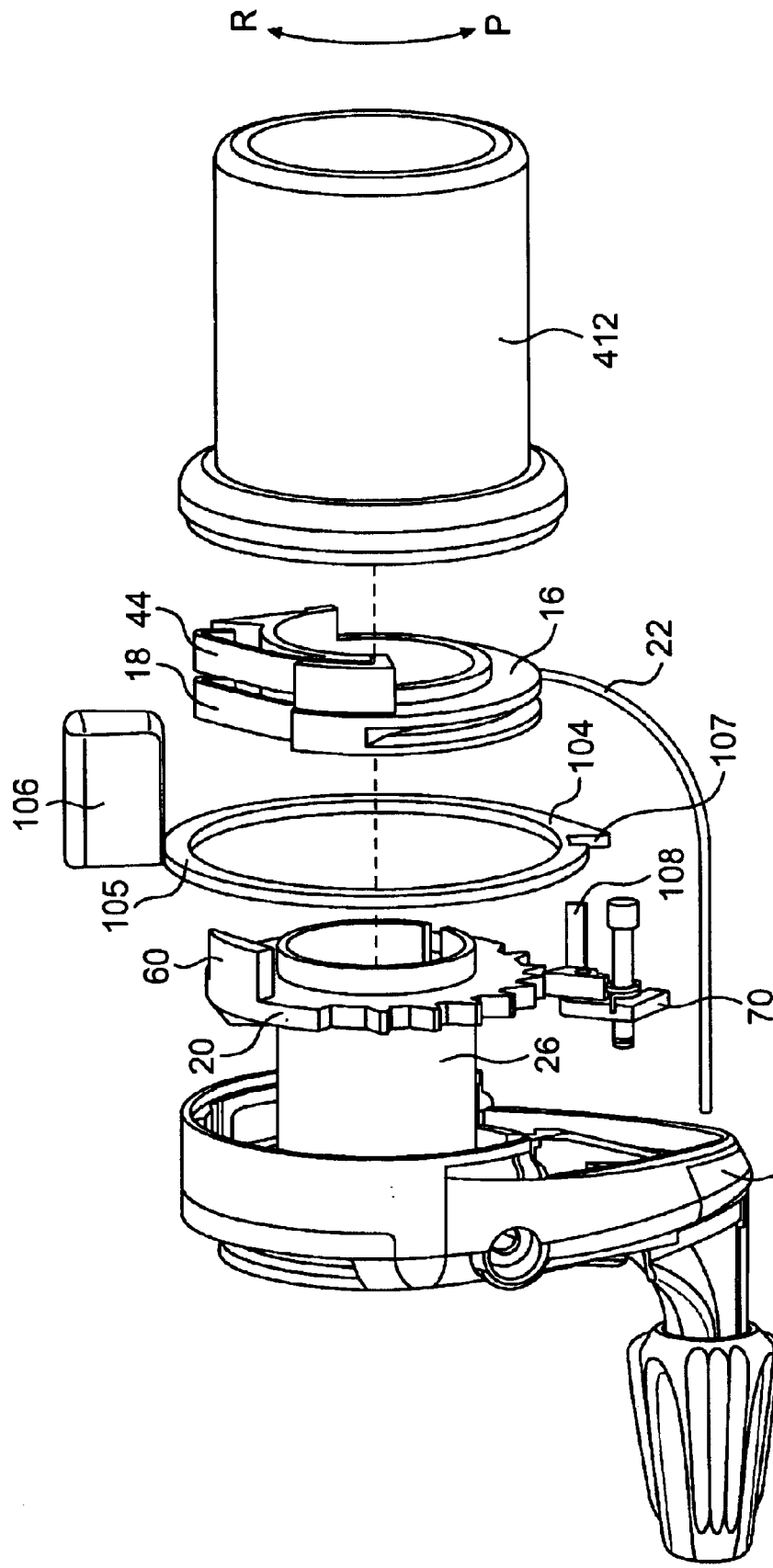
FIG. 13 is an exploded perspective view of a shifting device according to a fifth embodiment of the present invention.
Figure 14:
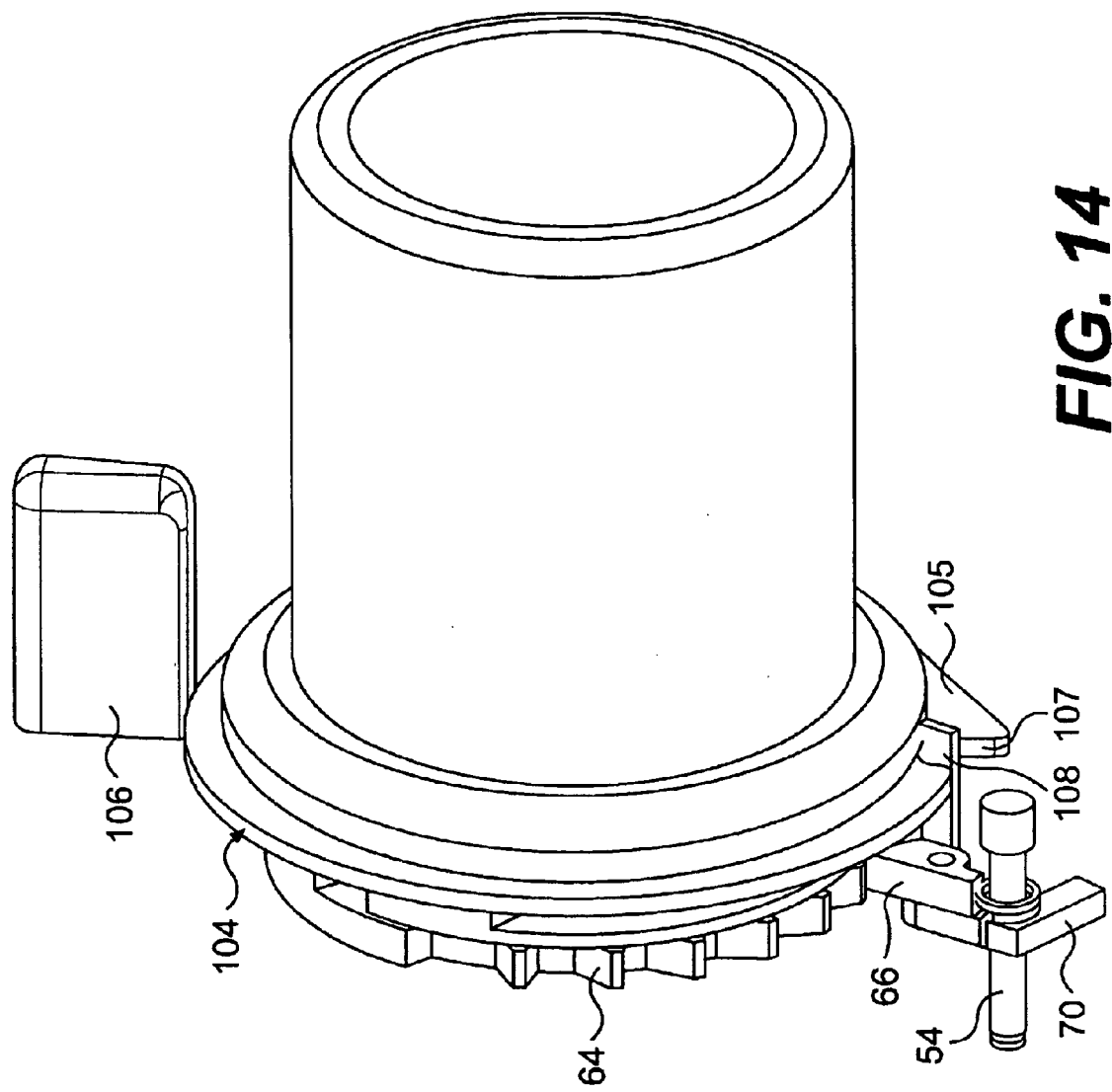
FIG. 14 is a perspective view of a release lever and a release transmission of the shifting device of FIG. 13.

FIGS. 13 and 14 show another embodiment of the invention where the release lever 14 of the first embodiment of FIGS. 1–6 is replaced by a second control member 104 rotatable about the handlebar. The release lever 104 includes a ring 105 that slides over the mandrel 24. A tab 106 extends from the ring 105 which the rider pushes in the clockwise direction to effect a release shift in the cable unwinding direction R. The ring 105 includes a protrusion 107 that engages with a driving member 108 extending from the pawl bracket 70. The advantage of this configuration is that the second control member 104 may rotate about the handlebar axis and still controllably release one gear at a time.

Figure 15:
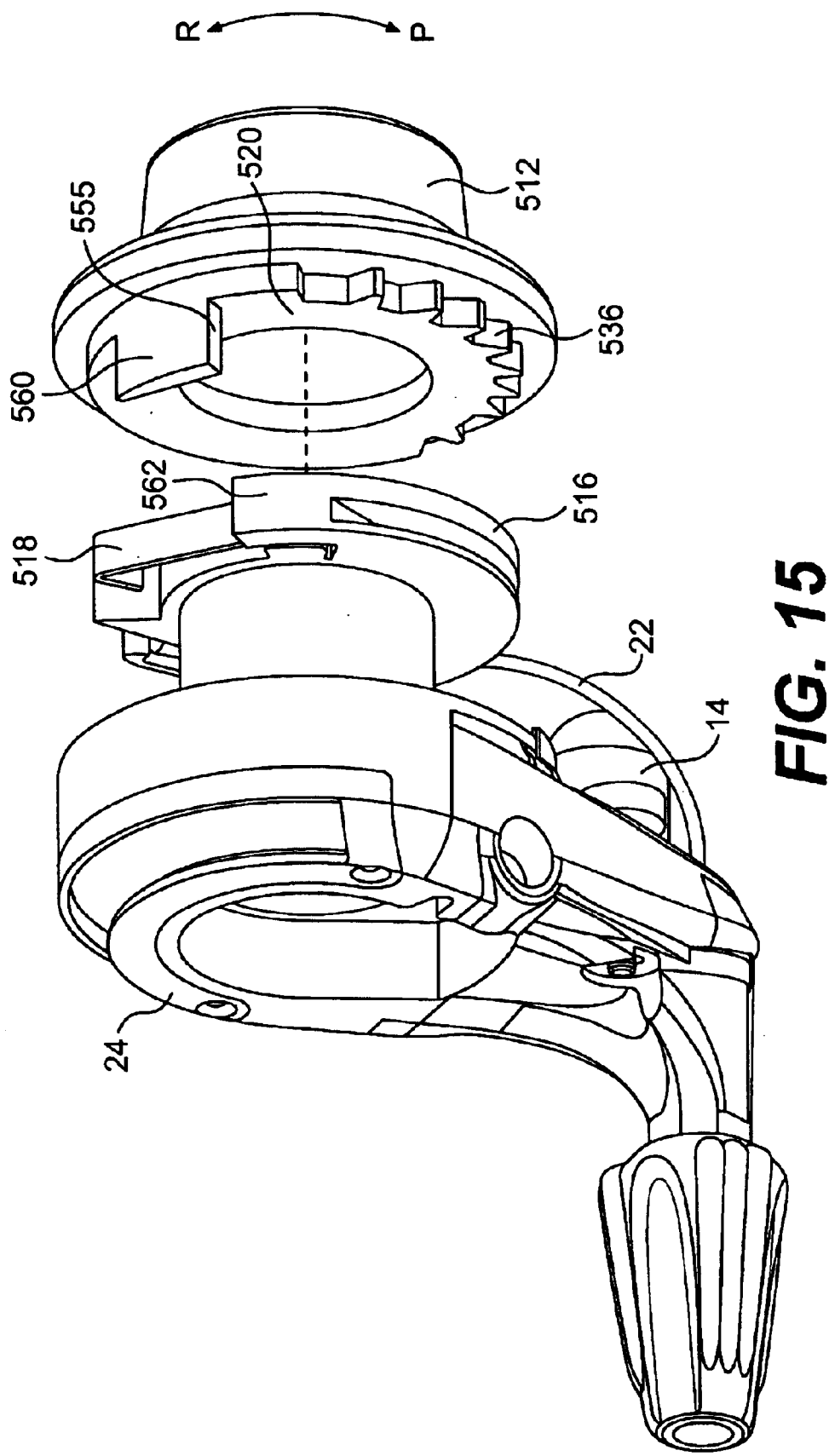
FIG. 15 is an exploded perspective view of a shifting device according to a sixth embodiment of the present invention.

FIG. 15 shows an additional embodiment of the invention where a first control member 512 may be used to both pull and release the control cable 22, the first control member 512 providing a secondary release control member in addition to the second control member 14. In this embodiment, the first control member 512 and a release member 520 are rotatably coupled in both the cable pull and release directions. Rotation of the first control member 512 in the cable pull direction is transmitted to a protrusion 562 of a takeup 516 by an end portion 555 of a release cam 560 of the release member 520. To release cable, the release lever 14 may be actuated to drive an array of teeth 536 located on the release member 520 to rotate the release member 520 in the cable release direction R. Rotation of the release member 520 in the cable release direction drives the release cam 560 to disengage the holding member 518 from the housing 24 allowing the takeup 516 to unwind under the tension of the control cable 22. Since the release member 520 and the first control member 512 are rotatably linked, the rider may alternatively rotate the first control member 512 in the cable release direction R to effect a release shift. The first control member 512 and the release member 520 may be formed integrally.

Figure 16:
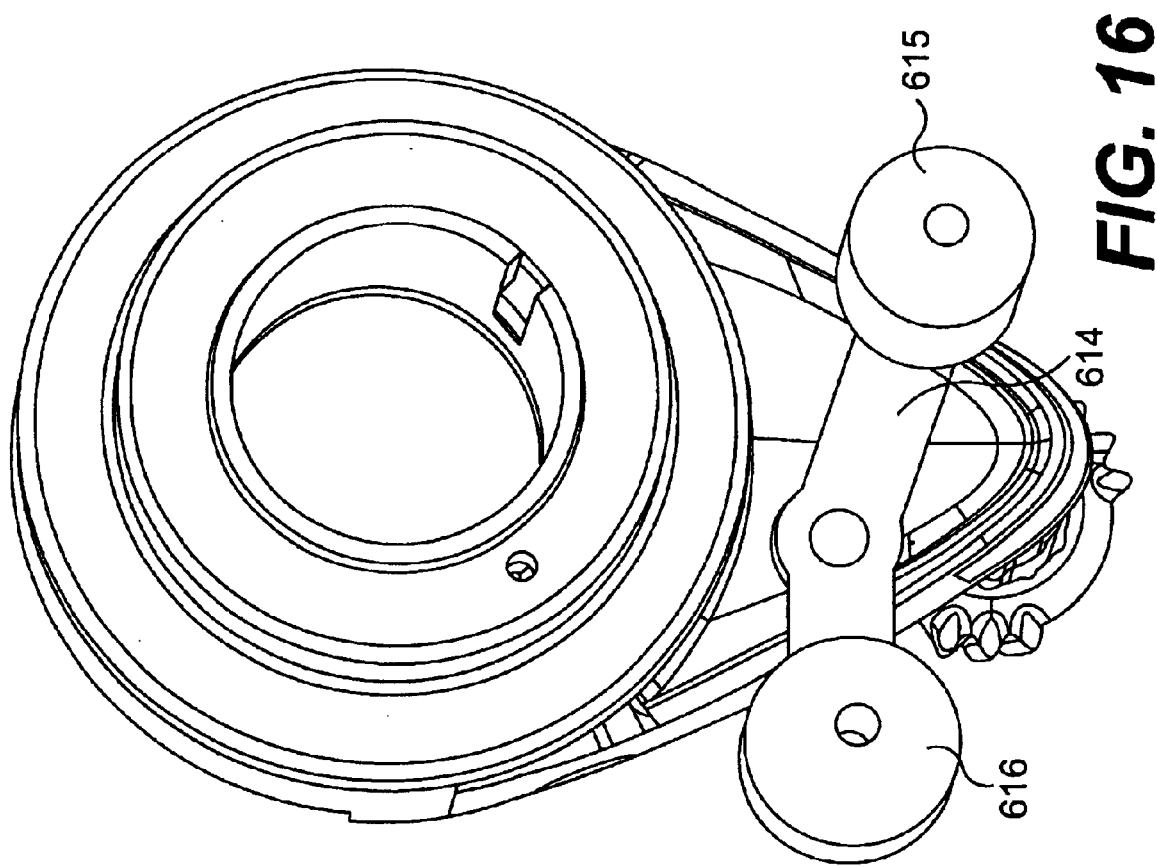
FIG. 16 is a perspective view of an alternative embodiment of the second control member.
Figure 17:
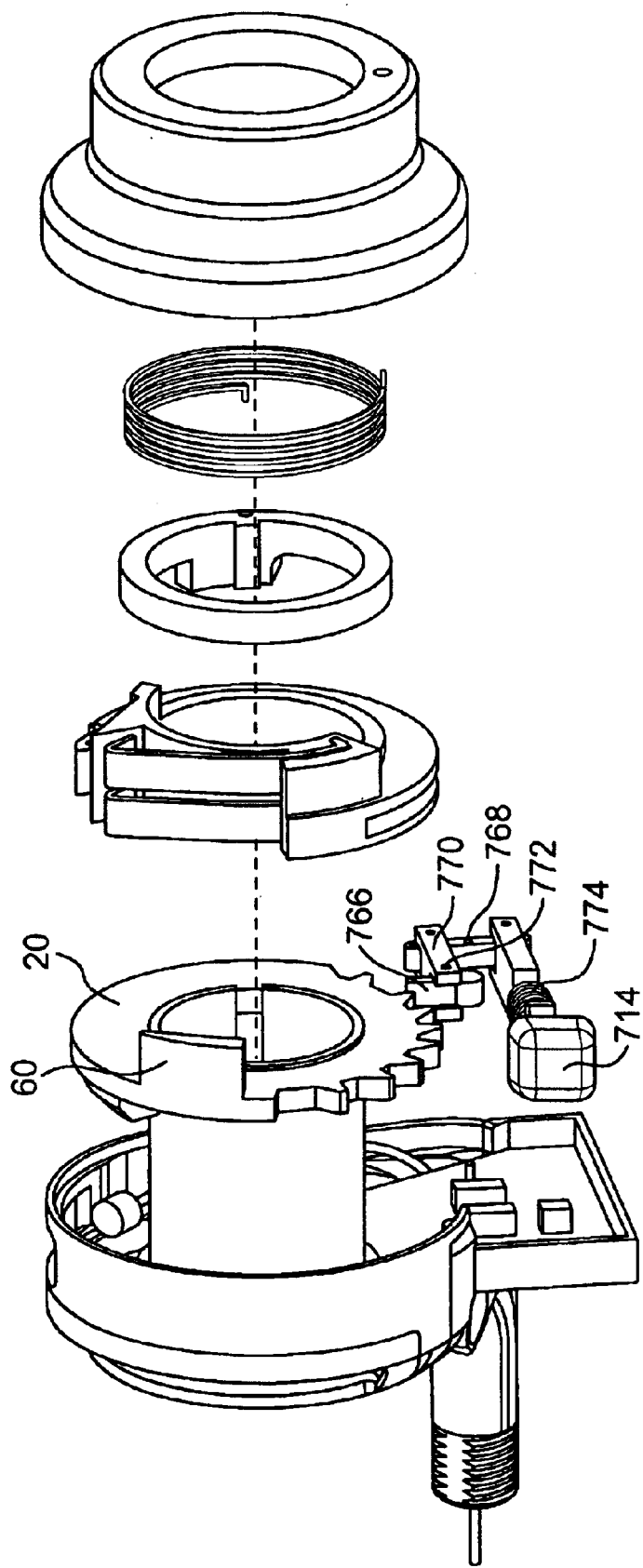
FIG. 17 is an exploded perspective view of a shifting device according to a seventh embodiment of the present invention.

FIG. 16 shows an alternative embodiment where a second control member 614 for releasing cable includes first and second control levers 615, 616, conveniently located in front and behind the handlebar for easy reach by either the thumb or index finger of the rider's hand.

Figure 19:
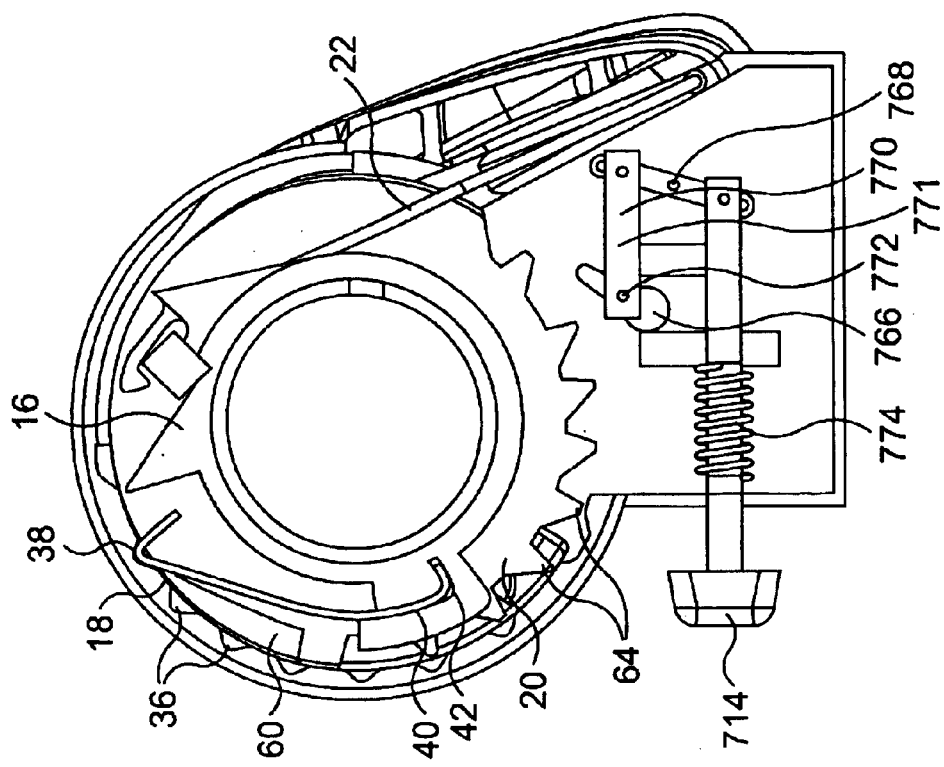
FIGS. 19–21 are cross-sectional views of the shifting device of FIG. 17 showing different operating positions of the release pawl.
Figure 18:
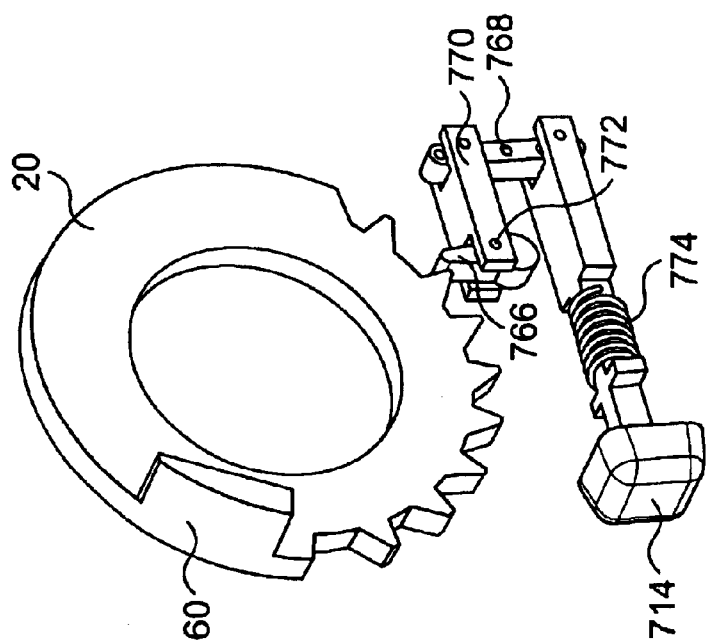
FIG. 18 is a perspective view of a release member, a release pawl and a second control member of the device of FIG. 17.
Figure 21:
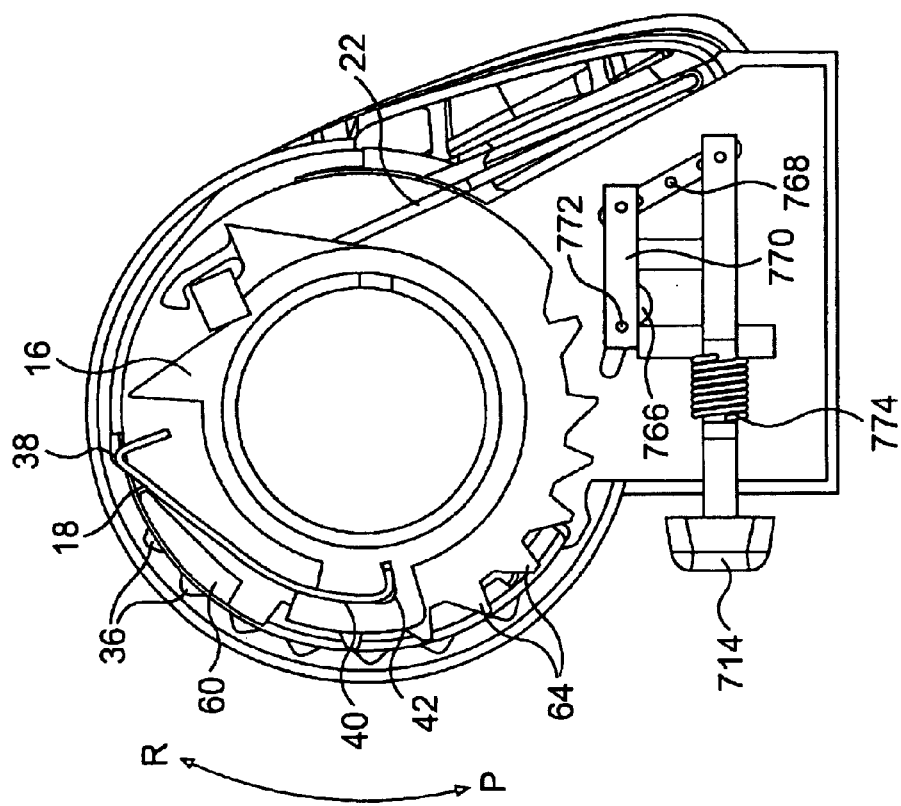
Figure 20:
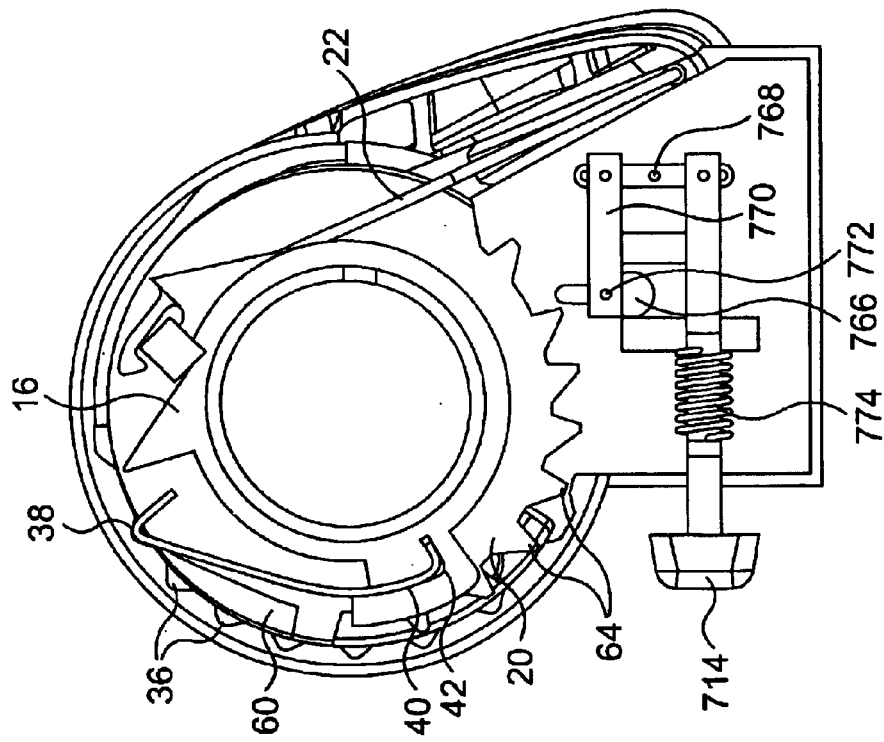

FIGS. 17–21 show yet another embodiment of the invention similar to the first embodiment of FIGS. 1–6 where the return-to-neutral rotating lever 14 of the first embodiment is replaced by a return-to-neutral axially displaceable push-button 714; respective members 66, 68, 70, 72, 74 and 766, 768, 770, 772 (hidden), 774 perform like functions; and the cable release steps depicted in FIGS. 19–21 correspond to those depicted in FIGS. 2–4. Looking to FIGS. 19–21, second control member 714 is axially reciprocally displaceable and biased by return spring 774 to the left. To release cable, a rider depresses push-button 714 to the right to actuate a linkage 770 which is pivotable about a hinge 768. Displacement of the push-button to the right, displaces an upper link member 771 to the left which in turn causing a release pawl 766, biased in the clockwise direction by a spring 772 (hidden), to rotate in a counterclockwise direction to initially engage the teeth 64 of release member 60 as shown in FIG. 20 and then rotate the release member in cable release direction R (FIG. 21). Upon release of push-button 714 by the rider's hand, return spring 774 returns push-button 714 to its rest or neutral position of FIG. 19.

While this invention has been described by reference to several preferred embodiments, it should be understood that numerous changes could be made within the spirit and scope of the inventive concepts described. For example, the first and second control members of the various embodiments can take the form of a handgrip or finger-actuated levers or push-buttons or the like. Additionally, the biased spring members shown in the various embodiments of this invention may take various forms including torsion, coil, wave, or leaf and may be loaded in various ways including tension, compression and in torsion. Additionally, the driving and holding members of the various embodiments of the invention may comprise leaf springs as shown or sprung pawls or similar ratcheting members and although preferably metallic, may be manufactured from different materials. Accordingly, it is intended that the invention not be limited to the disclosed embodiments, but that it be afforded the full scope permitted by the language of the following claims.

What is claimed is:

1. A bicycle shifter for mounting to a handlebar comprising:
   a takeup element supported to wind and unwind a control cable thereupon in a cable winding and a cable unwinding direction;
   a first control member rotatable about the handlebar for rotating the takeup element in at least the cable winding direction;
   a second control member supported by the handlebar for rotating the takeup element in the cable unwinding direction and having an actuation stroke and a return stroke;

a resilient member configured to bias the second control member in the direction of the return stroke substantially returning the second control member to a neutral position;

a holding member rotatable with the takeup element and configured to retain the takeup element in a select angular position; and a release member operable for releasing the holding member in response to one of the actuation and return strokes of the second control member for allowing the takeup element to rotate in the cable unwinding direction an amount corresponding to one gear shift.

2. The bicycle shifter of claim 1 further comprising a release transmission supported by the handlebar and operably connecting the second control member and the release member.

3. The bicycle shifter of claim 1 wherein the takeup element is rotatable about the handlebar.

4. The bicycle shifter of claim 3 wherein the release member comprises an annular structure rotatable about the handlebar.

5. The bicycle shifter of claim 4 further comprising a spring operably connecting the release member and the takeup element.

6. The bicycle shifter of claim 5 wherein the spring comprises a coil spring having a first end connected to the release member and a second end connected to the takeup element.

7. The bicycle shifter of claim 1 further comprising a driving member operatively connecting the first control member and the takeup element; and wherein the takeup element is rotatable separately from the first control member.

8. The bicycle shifter of claim 7 wherein the driving member is biased between the first control member and the takeup element; and further comprising a release cam operable with the release member for releasing the driving member in response to one of the actuation and return strokes of the second control member.

9. The bicycle shifter of claim 8 further comprising a return spring having a first end connected to the first control member and a second end supported by the handlebar.

10. The bicycle shifter of claim 8 further comprising a first control member ratchet supported by the handlebar and permitting unidirectional rotation of the first control member in the cable winding direction.

11. The bicycle shifter of claim 8 wherein the driving member comprises a driving ratchet.

12. The bicycle shifter of claim 11 wherein the ratchet comprises a driving spring having a first end supported by one of the first control member and the takeup element and a second end selectively engageable with an array of driving notches supported by a second one of the first control member and the takeup element, the notches corresponding to discrete gear shift positions.

13. The bicycle shifter of claim 12 wherein the holding member comprises a holding ratchet.

14. The bicycle shifter of claim 13 wherein the holding ratchet comprises a holding spring having a first end supported by one of the takeup element and the handlebar and a second end selectively engageable with an array of holding notches supported by a second one of the takeup element and the handlebar, the notches corresponding to discrete gear shift positions.

15. The bicycle shifter of claim 14 wherein the driving and holding springs are integrally formed.

16. The bicycle shifter of claim 8 wherein the release member and the release cam are integrally formed.

17. The bicycle shifter of claim 9 wherein the return spring comprises a torsion spring.

18. The bicycle shifter of claim 1 wherein the first control member comprises one of a handgrip and a finger-actuated lever.

19. The bicycle shifter of claim 1 wherein the second control member comprises a finger-actuated lever rotatable about an axis substantially parallel to the handlebar.

20. The bicycle shifter of claim 1 wherein the second control member is configured to rotate about the handlebar.

21. The bicycle shifter of claim 1 wherein the second control member is configured to be displaceable axially.

22. The bicycle shifter of claim 3 wherein the takeup element and the first control member are integrally formed.

23. The bicycle shifter of claim 4 wherein the release member and the first control member are integrally formed.

24. The bicycle shifter of claim 1 wherein the holding member comprises a holding ratchet.

25. The bicycle shifter of claim 24 wherein the holding ratchet comprises a holding spring having a first end supported by one of the takeup element and the handlebar and a second end selectively engageable with an array of holding notches supported by a second one of the takeup element and the handlebar, the notches corresponding to discrete gear shift positions.

26. The bicycle shifter of claim 1 wherein the takeup element is biased in the cable unwinding direction.

27. A bicycle shifter for mounting to a handlebar comprising:

a takeup element supported to wind and unwind a control cable thereupon in a cable winding and a cable unwinding directions, the takeup element biased in the cable unwinding direction;

a first control member rotatable about the handlebar for rotating the takeup element in at least the cable winding direction;

a second control member supported by the handlebar for rotating the takeup element in the cable unwinding direction and having an actuation stroke and a return stroke;

a resilient member configured to bias the second control member in the direction of the return stroke substantially returning the second control member to a neutral position;

a holding member rotatable with the takeup element and configured to retain the takeup element in a select angular position;

a release member operable for releasing the holding member in response to one of the actuation and return strokes of the second control member for allowing the takeup element to rotate in the cable unwinding direction an amount corresponding to one gear shift;

a release transmission supported by the handlebar and operably connecting the second control member and the release member;

a driving member operatively connecting and biased between the first control member and the takeup element, the takeup element rotatable separately from the first control member; and a release cam operable with the release member for releasing the driving member in response to one of the actuation and return strokes of the second control member.

28. The bicycle shifter of claim 27 wherein the takeup element is rotatable about the handlebar.

29. The bicycle shifter of claim 28 wherein the release member comprises an annular structure rotatable about the handlebar.

30. The bicycle shifter of claim 29 further comprising a spring operably connecting the release member and the takeup element.

31. The bicycle shifter of claim 30 wherein the spring comprises a coil spring having a first end connected to the release member and a second end connected to the takeup element.

32. The bicycle shifter of claim 27 further comprising a return spring having a first end connected to the first control member and a second end supported by the handlebar.

33. The bicycle shifter of claim 27 wherein the first control member comprises one of a handgrip and a finger-actuated lever.

34. The bicycle shifter of claim 27 wherein the second control member comprises a finger-actuated lever rotatable about an axis substantially parallel to the handlebar.

35. The bicycle shifter of claim 27 wherein the holding member comprises a holding ratchet.

36. The bicycle shifter of claim 35 wherein the holding ratchet comprises a holding spring having a first end supported by one of the takeup element and the handlebar and a second end selectively engageable with an array of holding notches supported by a second one of the takeup element and the handlebar, the notches corresponding to discrete gear shift positions.

37. The bicycle shifter of claim 27 wherein the driving member comprises a driving ratchet.

38. The bicycle shifter of claim 37 wherein the driving ratchet comprises a driving spring having a first end supported by one of the first control member and the takeup element and a second end selectively engageable with an array of driving notches supported by a second one of the first control member and the takeup element, the notches corresponding to discrete gear shift positions.

39. The bicycle gear shifter of claim 27 wherein the second control member is configured to rotate about the handlebar.

40. The bicycle shifter of claim 27 wherein the second control member is configured to be displaceable axially.

41. A bicycle shifter for mounting to a handlebar comprising:

a takeup element rotatable about the handlebar to wind and unwind a control cable thereupon in a cable winding and a cable unwinding direction, the takeup element biased in the cable unwinding direction;

a first control member rotatable about the handlebar for rotating the takeup element in at least the cable winding direction and comprising one of a handgrip and a first finger-actuated lever;

a second control member comprising a second finger-actuated lever supported by the handlebar for rotating the takeup element in the cable unwinding direction and having an actuation stroke and a return stroke;

a resilient member configured to bias the second control member in the direction of the return stroke substantially returning the second control member to a neutral position;

a holding member rotatable with the takeup element and configured to retain the takeup element in a select angular position;

an annular release member rotatable about the handlebar for releasing the holding member in response to one of the actuation and return strokes of the second control member for allowing the takeup element to rotate in the cable unwinding direction an amount corresponding to one gear shift;

a release transmission supported by the handlebar and operably connecting the second control member and the release member;

a driving member operatively connecting and biased between the first control member and the takeup element, the takeup element rotatable separately from the first control member;

a release cam operable with the release member for releasing the driving member in response to the actuation stroke of the second control member; and a return spring having a first end connected to the first control member and a second end supported by the handlebar.

42. The bicycle shifter of claim 41 wherein the holding member comprises a holding ratchet.

43. The bicycle shifter of claim 42 wherein the holding ratchet comprises a spring having a first end supported by one of the takeup element and the handlebar and a second end selectively engageable with an array of holding notches supported by a second one of the takeup element and the handlebar, the notches corresponding to discrete gear shift positions.

44. The bicycle shifter of claim 41 wherein the driving member comprises a driving ratchet.

45. The bicycle shifter of claim 44 wherein the driving ratchet comprises a driving spring having a first end supported by one of the first control member and the takeup element and a second end selectively engageable with an array of driving notches supported by a second one of the first control member and the takeup element, the notches corresponding to discrete gear shift positions.

46. The bicycle shifter of claim 41 wherein the second finger-actuated lever is rotatable about an axis substantially parallel to the handlebar.

47. The bicycle gear shifter of claim 41 wherein the second finger-actuated lever is configured to rotate about the handlebar.

48. The bicycle shifter of claim 41 wherein the second finger-actuated lever is configured to be displaceable axially.

* * * * *